United States Patent [19]
Brown et al.

[11] Patent Number: 6,134,896
[45] Date of Patent: Oct. 24, 2000

[54] BACKGROUND TANK FILL

[75] Inventors: William C. Brown, Bryan; Walter D. Murray, Pioneer; Gary P. Murray, Montpelier; Mark D. Pfleeger, Bryan, all of Ohio

[73] Assignee: SPX Corporation, Muskegon, Mich.

[21] Appl. No.: 09/272,789

[22] Filed: Mar. 19, 1999

[51] Int. Cl.[7] .................................................. F25B 45/00
[52] U.S. Cl. .................... 62/149; 62/77; 62/292
[58] Field of Search ................................ 62/149, 77, 292

[56] References Cited

U.S. PATENT DOCUMENTS

| | | |
|---|---|---|
| 4,193,269 | 3/1980 | Barry ........................................ 62/171 |
| 4,261,178 | 4/1981 | Cain . |
| 4,363,222 | 12/1982 | Cain . |
| 4,364,236 | 12/1982 | Lower et al. . |
| 4,441,330 | 4/1984 | Lower et al. . |
| 5,127,239 | 7/1992 | Manz et al. . |
| 5,167,126 | 12/1992 | Cartwright ................................ 62/129 |
| 5,172,562 | 12/1992 | Manz et al. . |
| 5,181,391 | 1/1993 | Manz . |
| 5,182,918 | 2/1993 | Manz et al. . |
| 5,193,351 | 3/1993 | Laukhuf et al. . |
| 5,209,077 | 5/1993 | Manz et al. . |
| 5,231,842 | 8/1993 | Manz et al. . |
| 5,390,503 | 2/1995 | Cheng ...................................... 62/125 |
| 5,423,190 | 6/1995 | Friedland ................................. 62/149 |
| 5,497,625 | 3/1996 | Manz et al. ............................... 62/3.3 |
| 5,548,966 | 8/1996 | Tinsler ....................................... 62/77 |
| 5,582,019 | 12/1996 | Hanna et al. ............................. 62/85 |
| 5,802,859 | 9/1998 | Zugibe ...................................... 62/125 |

Primary Examiner—William Doerrler
Assistant Examiner—Mark Shulman
Attorney, Agent, or Firm—Price, Heneveld, Cooper, DeWitt & Litton

[57] ABSTRACT

A refrigerant servicing system includes a main supply tank of refrigerant and an auxiliary tank which is coupled to the main tank by a valve which is selectively controlled by a circuit also coupled to weight and pressure sensors to assure the main tank has a level of refrigerant adequate for providing a continuous supply of refrigerant during servicing.

21 Claims, 4 Drawing Sheets

BACKGROUND TANK FILL

BACKGROUND OF THE INVENTION

The present invention relates to a service unit for servicing a refrigeration circuit and particularly to a system for assuring a supply of refrigerant remains available during the automatic servicing cycle.

Portable carts are used in connection with servicing refrigeration circuits, such as the air conditioning unit of a vehicle. The portable machines are coupled to the refrigeration circuit to be serviced and vacuum pumps and compressors operate to recover refrigerant from the vehicle's air conditioning unit, separate contaminants and oil from the recovered charge, flush the unit, and subsequently recharge the system from a supply of either recovered refrigerant and/or new refrigerant from a main refrigerant tank. U.S. Pat. No. 4,441,330 discloses one such apparatus.

In the past, when the supply of refrigerant would run low, a display system associated with the equipment would prompt the operator to connect an external tank and refill the refrigerant supply. This resulted in a time-consuming and potentially error-prone system by which a servicing cycle can be interrupted by the lack of adequate refrigerant or refrigerant could inadvertently escape to the atmosphere during the refilling of the refrigerant supply tank.

Thus, there exists a need for a system by which the supply of refrigerant employed for recharging a refrigerant circuit, such as a vehicle air conditioning unit, can be maintained at a serviceable level during use and without operator intervention.

SUMMARY OF THE INVENTION

The system of the present invention achieves this goal by providing a detector for detecting the status of refrigerant in a main refrigerant tank and providing an auxiliary tank which is coupled to the main tank by valve means which can be selectively operated to assure the main tank has a level of refrigerant adequate for providing a supply of refrigerant during servicing of a refrigeration circuit. This method and the apparatus incorporated to carry out the method assures that the main tank always has refrigerant therein and provides alternate refill modes for quick refilling and refilling during servicing of a refrigeration circuit, if required.

These and other features, objects and advantages of the present invention will become apparent upon reading the following description thereof together with reference to the accompanying drawings.

DETAILED DESCRIPTION OF THE PREFERRED EMBODIMENT

Figure 1:
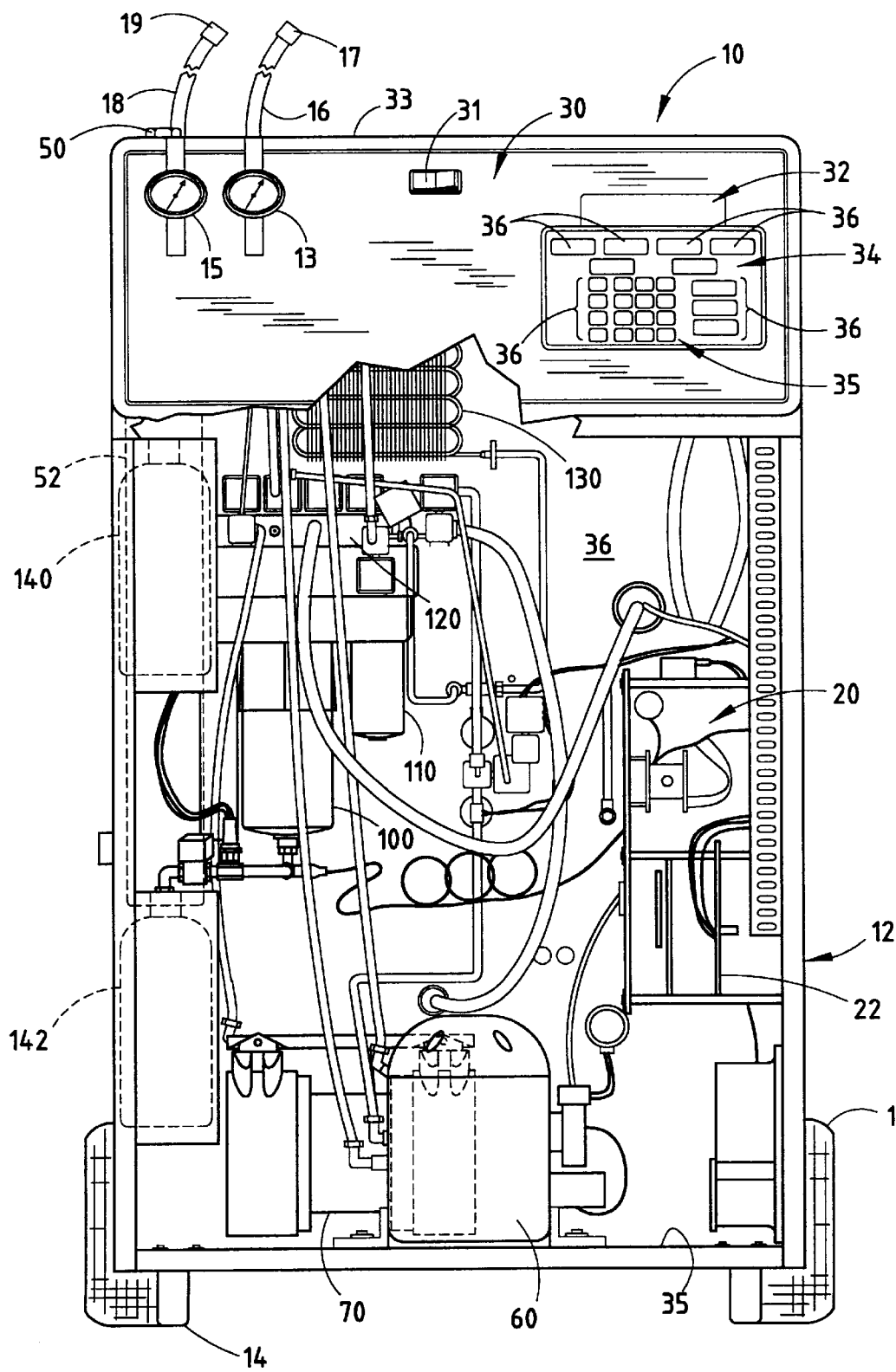
FIG. 1 is a front elevational view, partly broken away, of a refrigerant maintenance system for a vehicle which incorporates the present invention.

Referring initially to FIG. 1, there is shown a maintenance unit 10 for coupling to a refrigerant circuit such as a vehicle's air conditioning system for its maintenance. The unit 10 comprises a portable machine mounted within a cabinet 12 supported by a pair of wheels 14, such that it can be conveniently moved to the situs of a vehicle. Unit 10 includes a high pressure hose 16, typically color coded red, with a coupling 17 for coupling to the vehicle's high pressure port and a low pressure hose 18, typically color coded blue, having a coupling 19 for coupling to the low pressure port of the vehicle's refrigerant circuit. The front panel of the cabinet is shown broken away in FIG. 1 to show the major elements of the system which are also identified by similar numbers in the flow diagram of FIG. 3.

Figure 3:
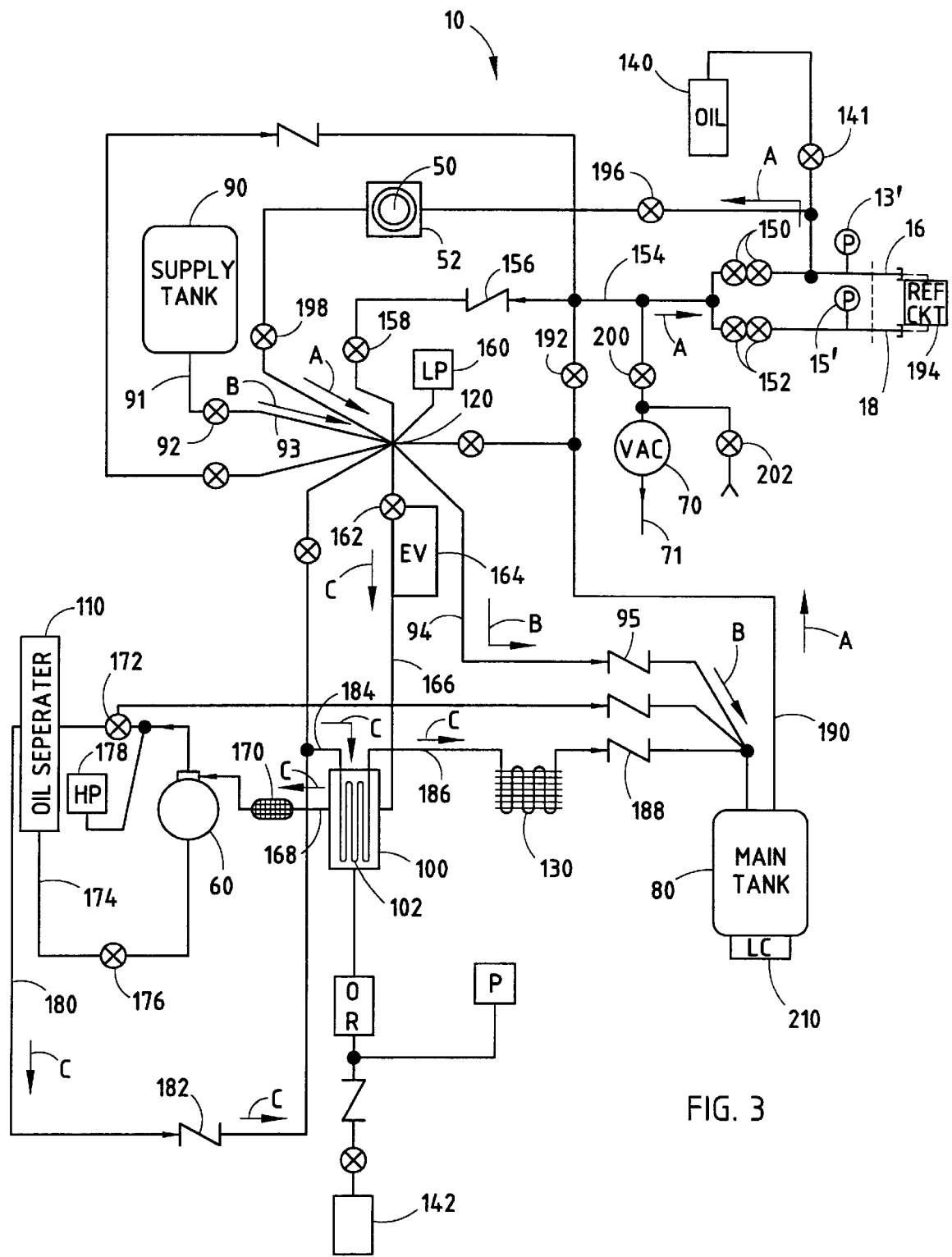
FIG. 3 is a flow diagram of the refrigerant recovery, flushing, evacuation, and recharging system incorporated in the system shown in FIG. 1.

The maintenance unit 10 includes an electronic module 20 integrally including a microprocessor on a circuit board 22 for controlling the electromechanical solenoid valves shown in the flow diagram of FIG. 3 and for receiving input information from the pressure sensors and control switches included on the control panel 30 shown in FIG. 1. The control panel 30 includes an on/off switch 31 and a display 32 for displaying the operational status of the machine operation, which display may be an LCD display or other suitable electronic display coupled to the microprocessor via a conventional input/output circuit. The display panel 30 further includes a switch panel 34 having a conventional keyboard 35 and a plurality of push-button switches 36 for controlling the operation of the machine through its various phases of operation and/or for selecting parameters for display. Thus, the keyboard 35 in conjunction with the operational switches 36 and display 32 allow the operator to enter the desired operational parameters for the machine according to manufacturer specifications for the servicing of an air conditioner unit in a particular vehicle.

The input hoses 16 and 18 are coupled to mechanical pressure gauges 13 and 15, respectively, which are mounted on the front panel of the service unit 10, as seen in FIG. 1. In addition, electrical pressure transducers 13' and 15' are coupled to the hoses 16 and 18, as shown in FIG. 3, and are coupled to the microprocessor through conventional input/output circuits to provide the microprocessor with pressure information during operation of the unit. Gauges 13 and 15 provide the operator with a conventional analog display of the pressure as well. Mounted to the top surface 33 of cabinet 12 is a sight gauge 50 which also includes an integral replaceable filter cartridge 52 mounted to the cabinet for filtering particulate material from the refrigerant during the flushing cycle as described in greater detail below.

Mounted to the floor 35 of cabinet 12 is a compressor 60 and a vacuum pump 70. Behind the front of cabinet 12 on an extension 35' of floor 35, there is mounted the main tank 80 of refrigerant (FIG. 2) for the supply of refrigerant to the system. Also mounted adjacent the main tank 80 is a secondary supply tank 90 which supplies make-up refrigerant to the main tank 80 as described in greater detail below. Mounted to the inside of rear wall 36 of cabinet 12 is an oil accumulator tank 100, a compressor oil separator filter 110, a manifold 120 shown as a node in FIG. 2, and a condenser 130. In addition, a fresh oil canister 140 is mounted within a side compartment of cabinet 12. A recovery oil container 142 is mounted on the lower part of the cabinet to receive oil drained from the accumulator 100.

Figure 2:
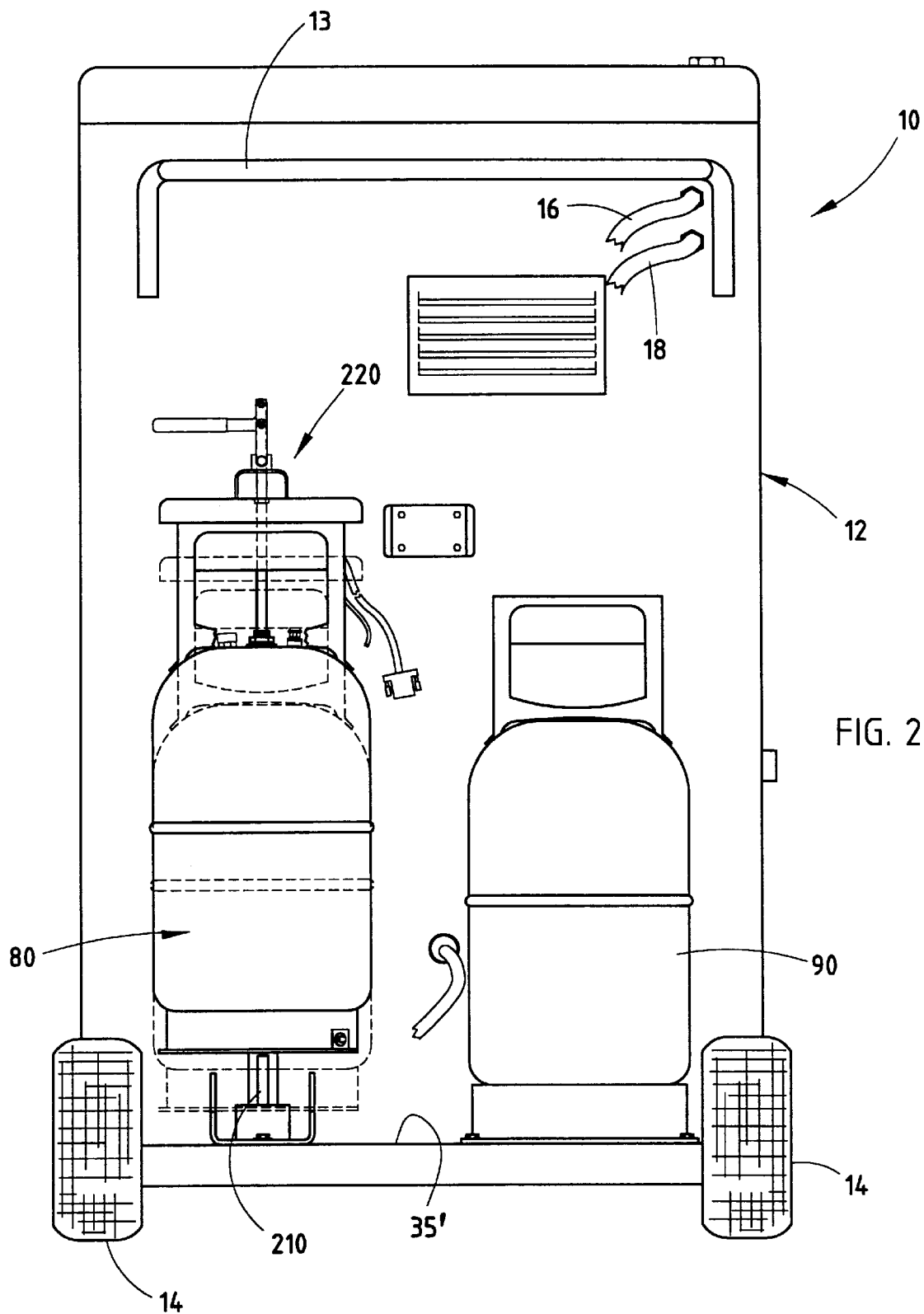
FIG. 2 is a rear elevational view of the service unit shown in FIG. 1.

Referring now to FIG. 2, there is shown the rear view of the service unit 10 in which the main supply tank 80 rests upon a rearwardly extending extension 35' of floor 35 on a load cell 210. The load cell provides a weight indicative signal to the microprocessor on circuit board 22 such that the weight of the tank comprising its tare weight plus the weight of refrigerant therein is monitored by the microprocessor to determine when additional refrigerant is needed. Tank 80 is mounted to the load cell 210 by a unique tank load-off assembly 220 which lifts and locks the tank in a raised position shown in solid lines in FIG. 2 spaced above the load cell during movement of the service unit 10 to prevent damage to the load cell and lowers the tank into a use position, shown in phantom lines in FIG. 2, when the service unit 10 is stationary and in use. The tank load-off assembly 220 is described in greater detail in the concurrently filed patent application entitled TANK UNLOAD APPARATUS Ser. No. 09/272,495, filed on Mar. 19, 1999, the disclosure of which is incorporated herein by reference.

Service unit 10 includes a handle 13 to facilitate movement of the service unit on wheels 14. Mounted adjacent the main refrigerant tank 80 is an auxiliary tank 90 which is plumbed to the main tank 80 as shown in FIG. 3 utilizing conventional high pressure hoses and connectors together with control valves for coupling tank 90 to tank 80. Having briefly described the major components of the refrigerant servicing unit 10 shown in FIGS. 1 and 2, a more detailed description of the system follows in connection with the FIG. 3 diagram, followed by the specific operation of the refrigerant make-up system as described in connection with FIGS. 3 and 4.

Initially, the hoses 16 and 18 are coupled to the vehicle and the recovery cycle is initiated by the opening of the dual back-to-back high pressure and low pressure solenoids 150, 152, respectively (FIG. 3). This allows the refrigerant within the vehicle to flow through conduits 154 through check valve 156 and recovery valve 158 into the manifold 120. A low pressure switch 160 senses the pressure and provides an output signal coupled to the microprocessor through a suitable interface circuit which is programmed to detect when the pressure has recovered refrigerant down to 13 inches of mercury. The refrigerant then flows through valve 162 and unit 164 via conduit 166 into the accumulator 100 where it travels through an output conduit 168 through a water separating molecular sieve 170 to the input of compressor 60. Compressor 60 draws the refrigerant through the compressor through a valve 172 and through the oil separating filter 110 for the compressor which circulates oil back to the compressor through conduit 174 and oil return valve 176. A pressure transducer 178 is coupled to the microprocessor which is programmed to determine the upper pressure limit of, for example, 435 psi to shut down the compressor in the event the pressure becomes excessive. The compressed refrigerant exits the oil separator through conduit 180, through check valve 182 and through a heating coil 102 in accumulator 100 via conduit 184. The heated compressed refrigerant flowing through coil 102 assists in maintaining the temperature in accumulator 100 within a working range. The refrigerant then flows through conduit 186 to the condenser 130 which cools the compressed refrigerant which next flows through check valve 188 and into the main tank 80.

Subsequent to this recovery process, the automatic flushing cycle is initiated. The flow path, however, for the flushing cycle comprises conduit 190 extending from a dip tube in the main refrigerant storage tank 80 in a direction indicated by arrow A in FIG. 3. The flow path continues through the charging valve 192, which is opened for purposes of flushing the system, through conduit 154 in the direction indicated by arrow A in FIG. 3, through the low pressure hose 18 by the opening of solenoid valves 152 and into the vehicle's refrigerant system indicated schematically by block 194. The flow returns through the high pressure hose 16 then, as indicated by arrow A, through the now-opened flush valve 196, through the sight gauge 50 and its filter 52, and through the second flush valve 198 and into manifold 120. From there, the refrigerant follows the same path through the accumulator 100 as described above in connection with the recovery cycle to finish in the main tank 80. During this flush cycle, which is programmed for a default time of 30 minutes, the filter 52 associated with the sight gauge removes any particulate material while the molecular sieve 170 removes water particles and accumulator 100 removes waste oil, thus resulting in a vehicle system with clean refrigerant therein.

Once the flushing cycle has been completed, the evacuation cycle begins by the opening of solenoids 150 and 152 and valve 200, leading to the input of vacuum pump 70. Prior to opening valve 200, air intake valve 202 is opened, allowing the vacuum pump to start up exhausting air through outlet 71. The vehicle system 194, which is at a relatively low pressure at the end of the flush cycle is then evacuated by the closing of valve 202 and the opening of valve 200, allowing the vacuum pump 70 to exhaust any trace gases remaining until the pressure is approximately 29 inches of mercury. When this occurs, as detected by pressure transducers 13' and 15' coupled to the microprocessor, the microprocessor actuates valve 200 turning it off and the recharging cycle is begun as now described.

The flow path of the recharging cycle is part of the flush cycle in which charge valve 192 is opened as are solenoids 150 to allow the liquid refrigerant in tank 80, which is at a pressure of approximately 70 psi or above, to flow through conduit 154. The flow is in the direction indicated by arrow A through high-pressure solenoids 150 for a period of time programmed to provide a full charge of refrigerant to the vehicle.

Figure 4:
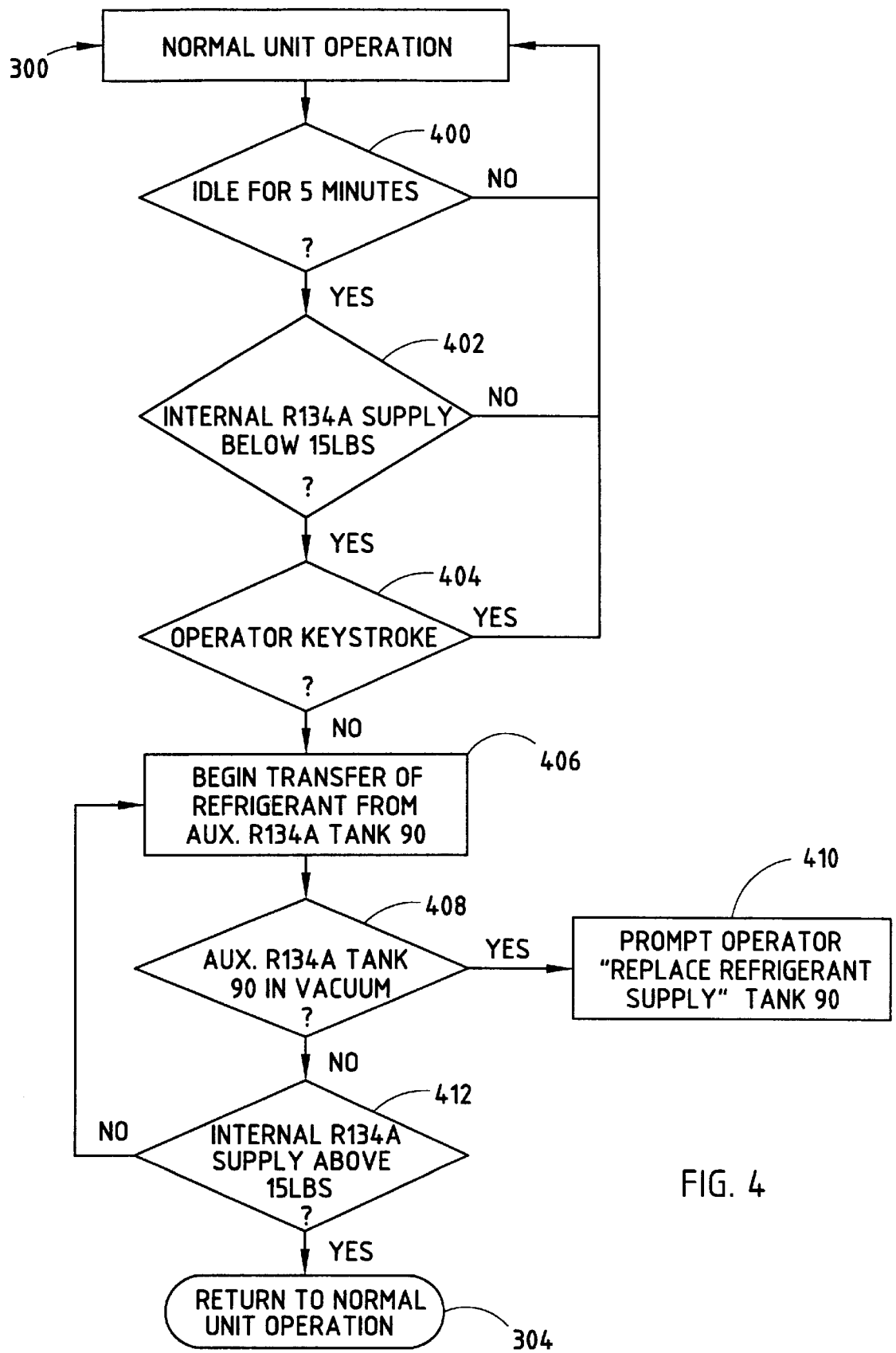
FIG. 4 is a flow diagram of the microprocessor program employed for transferring refrigerant from the auxiliary tank to the main tank.

Having described the overall system operation, the automatic tank fill structure is now described in greater detail in connection with FIG. 3 followed by a description of its operation in accordance with the programming flow diagram of FIG. 4. The main tank 80 will include recovered refrigerant which has been filtered and cleaned by the recovery and purging process described above. In addition, the auxiliary supply tank 90 will include fresh refrigerant of the same type used in the main tank 80. The auxiliary tank 90 is coupled to a solenoid actuated valve 92 by means of a high pressure conduit 91. A conduit 93 couples the solenoid valve 92, which is controlled by the microprocessor, to the manifold 120, to which a low pressure or vacuum switch 160 is coupled. When valve 92 is opened, refrigerant from tank 90 flows directly into tank 80 in a path as shown by arrow B in FIG. 3 through valve 92, conduits 91 and 93 into manifold 120, through conduit 94 and check valve 95 into tank 80. This is particularly useful upon initializing the system when main tank 80 has been evacuated and no refrigerant is initially present. The opening of valve 92 allows the pressure in tanks 90 and 80 to equalize, providing a sufficient amount of refrigerant in tank 80 for operation of the system.

The normal filling path, however, during operation of the system where the refrigerant in tank 80 is sufficiently high is through the pathway indicated by arrow C in FIG. 3. This path includes the accumulator 100, filter 170, compressor 60, separator 110, back through the cooling coil 102 of accumulator 100, through check valve 182, through condenser 130 and check valve 188 into the main tank 80. This occurs when the microprocessor applies a signal to open valve 92 as described in connection with FIG. 4 below. The low pressure sensor switch 160 also sends a signal to the microprocessor providing an alarm signal to the operator indicating when the auxiliary supply tank 90 is emptied and being pulled into a vacuum. When this occurs, sufficient refrigeration exists in tank 80 to allow completion of a recharging cycle of the refrigerant circuit and also allow the operator to reconnect a fresh supply tank 90 as required. For such purpose, it is understood that tank 90, which can be of a conventional design, includes a shut-off valve for coupling conduits 91 thereto.

The operation of the system to incrementally add refrigerant from supply tank 90 to main tank 80, in addition to initially filling the main tank, is now described in connection with FIG. 4. Such operation assures that the main tank will always have an adequate supply of refrigerant to service a refrigeration circuit.

The programming of the microprocessor begins with the normal operation of the unit through a recovering/recharging mode, as indicated by block 300 and as described in greater detail in the above-identified application entitled REFRIGERANT RECOVERY AND RECHARGING SYSTEM WITH AUTOMATIC FLUSHING, the disclosure of which is incorporated herein by reference. The program then tests to determine if the unit has been in operation for five minutes or more, as indicated by block 400. If the unit has not be idle, it returns to the normal unit operation as indicated by block 300. If, however, the operator has completed servicing a refrigerant system of a vehicle and the servicing unit 10 has been idle for five minutes, the program tests, as indicated by block 402, whether the refrigerant supply in tank 80 is below 15 pounds as determined by a signal from the load cell 210 coupled to the microprocessor through a conventional interface circuit. If the supply remains above 15 pounds, the unit returns to normal operation, as indicated by block 300. If, however, the supply of refrigerant in tank 80 has dropped below 15 pounds, a test is conducted, as indicated by block 404, to determine whether or not the operator has initiated a new cycle of normal operation, and, if the operator has, the program returns to normal operation, as indicated by block 300. If the operator has not initiated a cycle of operation, the valve 92 is actuated, as indicated by block 406, to transfer refrigerant from tank 90 to tank 80 through the flow path indicated by arrow B in FIG. 3. The program then continues testing to determine whether the low pressure sensor 160 indicates that tank 90 is below atmospheric pressure as indicated by block 408. If it is, the microprocessor sends a signal to display 32 to prompt the operator to replace the refrigerant supply tank 90, as indicated by block 410. If the pressure sensor 160, however, does not detect a below-atmospheric condition in the manifold 120 coupled to the supply tank 90 when valve 92 is operated, the program then tests, as indicated by block 412 to determine whether the supply of refrigerant in tank 80 is above 15 pounds, and, if it is, the program returns to normal operation as indicated by block 304. If not, the program returns to block 406, actuating valve 92 to add refrigerant until the supply exceeds 15 pounds. Thus, whenever the amount of refrigerant in tank 80 falls below 15 pounds, valve 92 will be actuated to either provide refrigerant, as indicated by flow path B to equalize the pressure in tanks 90 and 80 or during the normal operation through the flow path indicated by arrow C to draw an additional supplemental refrigerant as required when the main tank of refrigerant is low. The low pressure sensor 160 assures that the supply tank 90 remains available for make-up refrigerant as required and well prior to the lack of adequate refrigerant in the unit 10.

Thus, with the system of the present invention, a supply of refrigerant remains available during all operating conditions, which assures uninterrupted servicing of a refrigerant circuit of a vehicle or other system being serviced. It will become apparent to those skilled in the art that various modifications to the preferred embodiment of the invention can be made without departing from the spirit or scope of the invention as defined by the appended claims.

The invention claimed is:

1. A system for adding refrigerant to a refrigeration circuit comprising:

a main supply of refrigerant;

an auxiliary supply of refrigerant;

a conduit and an electrically actuated control valve coupling said auxiliary tank to said main tank;

a control circuit coupled to said control valve for selectively actuating said control valve to assure said main supply has a predetermined amount of refrigerant therein; and a pressure sensor coupled to said conduit coupling said auxiliary supply to said main supply for determining the pressure in said auxiliary supply and wherein said pressure sensor is coupled to said control circuit which responds to signals therefrom to provide an operator prompt signal indicating that the auxiliary supply requires replacement when the detected pressure reaches a predetermined level.

2. The system as defined in claim 1 and further including a pressure sensor coupled to said conduit coupling said auxiliary supply to said main supply for determining the pressure in said auxiliary supply and wherein said pressure sensor is coupled to said control circuit which responds to signals therefrom to provide an operator prompt signal indicating that the auxiliary supply requires replacement when the detected pressure reaches a predetermined level.

3. A system for adding refrigerant to a refrigeration circuit comprising:

a main supply of refrigerant;

an auxiliary supply of refrigerant;

a conduit and an electrically actuated control valve coupling said auxiliary tank to said main tank;

a control circuit coupled to said control valve for selectively actuating said control valve to assure said main supply has a predetermined amount of refrigerant therein; and a weight sensor coupled to said control circuit, wherein said main supply is a tank which is positioned on said weight sensor, and said control circuit is responsive to signals from said weight sensor indicating refrigerant has fallen below a predetermined level to actuate said valve to allow refrigerant from said auxiliary tank to flow into said main tank.

4. The system as defined in claim 3 wherein said weight sensor is a load cell.

5. A system for adding refrigerant to a refrigeration circuit comprising:

a main supply of refrigerant;

an auxiliary supply of refrigerant;

a conduit and an electrically actuated control valve coupling said auxiliary tank to said main tank;

a control circuit coupled to said control valve for selectively actuating said control valve to assure said main supply has a predetermined amount of refrigerant therein; and a weight sensor comprising a load cell coupled to said control circuit, and wherein said main supply is a tank which is positioned on said weight sensor, said control circuit responsive to signals from said weight sensor indicating refrigerant has fallen below a predetermined level to actuate said valve to allow refrigerant from said auxiliary tank to flow into said main tank, wherein said control circuit opens said valve when the weight of refrigerant in said main tank falls to about 15 pounds.

6. The system as defined in claim 5 and further including a pressure sensor coupled to said conduit coupling said auxiliary supply to said main tank for determining the pressure in said auxiliary supply and wherein said pressure sensor is coupled to said control circuit which responds to signals therefrom to provide an operator prompt signal indicating that the auxiliary supply requires replacement when the detected pressure reaches a predetermined level.

7. A flushing system for servicing a refrigerant system comprising:

a first conduit coupled in the refrigerant flow path of a refrigerant system;

a main supply of pressurized refrigerant;

an electrically actuated valve coupled to said first conduit and to said main supply for selectively providing a fluid flow path from said main supply of pressurized refrigerant to said first conduit;

a compressor having an input and an output, wherein said input is coupled to said first conduit and said output is coupled to said main supply of refrigerant;

a replaceable filter in series with said first conduit for filtering impurities from refrigerant flowing in said conduit;

an auxiliary supply of refrigerant;

a second conduit and a second electrically actuated valve for selectively coupling said auxiliary supply to said main supply;

a control circuit coupled to said first and second valves for selectively actuating said valves to supply a predetermined amount of refrigerant to the refrigeration circuit and to transfer refrigerant from said auxiliary supply to said main supply to assure the main supply has a predetermined amount of refrigerant therein; and a weight sensor coupled to said control circuit, and wherein said main supply is a tank which is positioned on said weight sensor, said control circuit responsive to signals from said weight sensor indicating refrigerant has fallen below a predetermined level to actuate said second valve to allow refrigerant from said auxiliary supply to flow into said main tank.

8. The system as defined in claim 7 and further including a pressure sensor coupled to said second conduit coupling said auxiliary supply to said main supply for determining the level of pressure in said auxiliary supply and wherein said control circuit is coupled to said pressure sensor and provides an operator prompt signal when the pressure falls below a predetermined level indicating the auxiliary supply requires replacement.

9. The system as defined in claim 8 and further including a weight sensor coupled to said control circuit, and wherein said main supply is a tank which is positioned on said weight sensor, said control circuit responsive to signals from said weight sensor indicating refrigerant has fallen below a predetermined level to actuate said second valve to allow refrigerant from said auxiliary supply to flow into said main tank.

10. The system as defined in claim 3 wherein said weight sensor is a load cell.

11. A flushing system for servicing a refrigerant system comprising:

a first conduit coupled in the refrigerant flow path of a refrigerant system;

a main supply of pressurized refrigerant;

an electrically actuated valve coupled to said first conduit and to said main supply for selectively providing a fluid flow path from said main supply of pressurized refrigerant to said first conduit;

a compressor having an input and an output, wherein said input is coupled to said first conduit and said output is coupled to said main supply of refrigerant;

a replaceable filter in series with said first conduit for filtering impurities from refrigerant flowing in said conduit;

an auxiliary supply of refrigerant;

a second conduit and a second electrically actuated valve for selectively coupling said auxiliary supply to said main supply;

a control circuit coupled to said first and second valves for selectively actuating said valves to supply a predetermined amount of refrigerant to the refrigeration circuit and to transfer refrigerant from said auxiliary supply to said main supply to assure the main supply has a predetermined amount of refrigerant therein;

a pressure sensor coupled to said second conduit coupling said auxiliary supply to said main supply for determining the level of pressure in said auxiliary supply and wherein said control circuit is coupled to said pressure sensor and provides an operator prompt signal when the pressure falls below a predetermined level indicating the auxiliary supply requires replacement; and a weight sensor comprising a load cell coupled to said control circuit, and wherein said main supply is a tank which is positioned on said weight sensor, said control circuit responsive to signals from said weight sensor indicating refrigerant has fallen below a predetermined level to actuate said second valve to allow refrigerant from said auxiliary supply to flow into said main tank, wherein said control circuit opens said second valve when the weight of refrigerant in said main tank falls to about 15 pounds.

12. A process for assuring that the refrigerant level in a refrigerant supply tank for a service unit remains above a predetermined level comprising the steps of:

coupling a main refrigerant tank to a service module for recovering refrigerant from a refrigerant circuit and supplying refrigerant to said refrigerant circuit;

providing an auxiliary refrigerant tank;

providing an electrically controlled valve and a control circuit coupled to said valve for selectively actuating said valve for selectively coupling said auxiliary refrigerant tank to said main refrigerant tank when the refrigerant level in said main refrigerant tank falls below a predetermined level; and wherein said actuating step comprises sensing the weight of refrigerant in said main tank and opening said valve when said weight falls below a predetermined level.

13. The process as defined in claim 12 wherein said coupling step comprises providing an electrically controlled valve and a control circuit coupled to said valve for selectively actuating said valve for coupling said auxiliary tank to said main tank.

14. The process as defined in claim 13 wherein said actuating step comprises sensing the weight of refrigerant in said main tank and opening said valve when said weight falls below a predetermined level.

15. The process as defined in claim 12 and further including the steps of sensing the pressure in said auxiliary tank.

16. The process as defined in claim 15 and further including providing an operator prompting signal to replace said auxiliary tank when the sensed pressure falls below a predetermined level.

17. A system for servicing the air conditioning system of a vehicle comprising:

a main tank of refrigerant;

an auxiliary tank of refrigerant;

a control valve and a first conduit for coupling said auxiliary tank to said main tank;

a second conduit including an oil separator for coupling in series with the refrigerant circuit of the vehicle's air conditioning system;

a control circuit coupled to said control valve for selectively actuating said control valve to said main tank during servicing of the air conditioning system; and a weight sensor coupled to said control circuit, and wherein said main tank which is positioned on said weight sensor, said control circuit responsive to signals from said weight sensor indicating refrigerant has fallen below a predetermined level to actuate said valve to allow refrigerant from said auxiliary tank to flow into said main tank.

18. The system as defined in claim 17 and further including a weight sensor coupled to said control circuit, and wherein said main tank which is positioned on said weight sensor, said control circuit responsive to signals from said weight sensor indicating refrigerant has fallen below a predetermined level to actuate said valve to allow refrigerant from said auxiliary tank to flow into said main tank.

19. The system as defined in claim 18 wherein said weight sensor is a load cell.

20. A system for servicing the air conditioning system of a vehicle comprising:

a main tank of refrigerant;

an auxiliary tank of refrigerant;

a control valve and a first conduit for coupling said auxiliary tank to said main tank;

a second conduit including an oil separator for coupling in series with the refrigerant circuit of the vehicle's air conditioning system;

a control circuit coupled to said control valve for selectively actuating said control valve to said main tank during servicing of the air conditioning system; and a weight sensor comprising a load cell coupled to said control circuit, and wherein said main tank which is positioned on said weight sensor, said control circuit responsive to signals from said weight sensor indicating refrigerant has fallen below a predetermined level to actuate said valve to allow refrigerant from said auxiliary tank to flow into said main tank, wherein said control circuit opens said valve when the weight of refrigerant in said main tank falls to about 15 pounds.

21. The system as defined in claim 20 and further including a pressure sensor coupled to said conduit coupling said auxiliary supply to said main tank for determining the pressure in said auxiliary supply and wherein said pressure sensor is coupled to said control circuit which responds to signals therefrom to provide an operator prompt signal indicating that the auxiliary supply requires replacement when the detected pressure reaches a predetermined level.

* * * * *